(12) United States Patent
Glaser

(10) Patent No.: US 6,868,275 B2
(45) Date of Patent: Mar. 15, 2005

(54) METHOD AND CONFIGURATION FOR TRANSMITTING DATA IN A MOTOR VEHICLE

(75) Inventor: Telmo Glaser, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 518 days.

(21) Appl. No.: 09/922,052

(22) Filed: Aug. 2, 2001

(65) Prior Publication Data
US 2002/0016176 A1 Feb. 7, 2002

(30) Foreign Application Priority Data

Aug. 2, 2000 (DE) .......................................... 100 37 727
Jun. 21, 2001 (DE) .......................................... 101 29 945

(51) Int. Cl.[7] ................................................ H04B 7/00
(52) U.S. Cl. ..................... 455/500; 455/39; 455/14; 455/24
(58) Field of Search ................................ 455/500, 130, 455/24, 73, 13.2, 14, 39, 91; 375/240.11, 240.22, 240.23, 240.26, 260, 295, 316; 340/904, 932.2, 933, 426.16, 426.24; 701/51; 710/2, 20

(56) References Cited

U.S. PATENT DOCUMENTS

| 4,442,546 | A | * | 4/1984 | Ishigaki ........................ 455/72 |
| 5,771,182 | A | * | 6/1998 | Baker et al. ................. 708/203 |
| 5,835,538 | A | * | 11/1998 | Townshend .................. 375/295 |
| 6,177,801 | B1 | * | 1/2001 | Chong ........................ 324/520 |
| 6,225,898 | B1 | * | 5/2001 | Kamiya et al. .............. 340/505 |
| 6,751,209 | B1 | * | 6/2004 | Hamiti et al. ............... 370/349 |

FOREIGN PATENT DOCUMENTS

| DE | 38 09 299 A1 | 9/1989 |
| DE | 39 12 440 A1 | 10/1990 |
| DE | 196 34 714 A1 | 3/1998 |
| DE | 198 44 663 A1 | 4/2000 |

* cited by examiner

Primary Examiner—Nick Corsaro
Assistant Examiner—Shaima Q Aminzay
(74) Attorney, Agent, or Firm—Laurence A. Greenberg; Werner H. Stemer; Ralph E. Locher

(57) ABSTRACT

A method for extracting a constant part and a variable part from a data signal that is determined. The values that are extracted in this way are transmitted with different timing over a transmission link that is present. Depending on the bandwidth of the composite signal, various methods can be applied for transmitting relatively low bandwidth signals with possibly higher resolution.

14 Claims, 3 Drawing Sheets

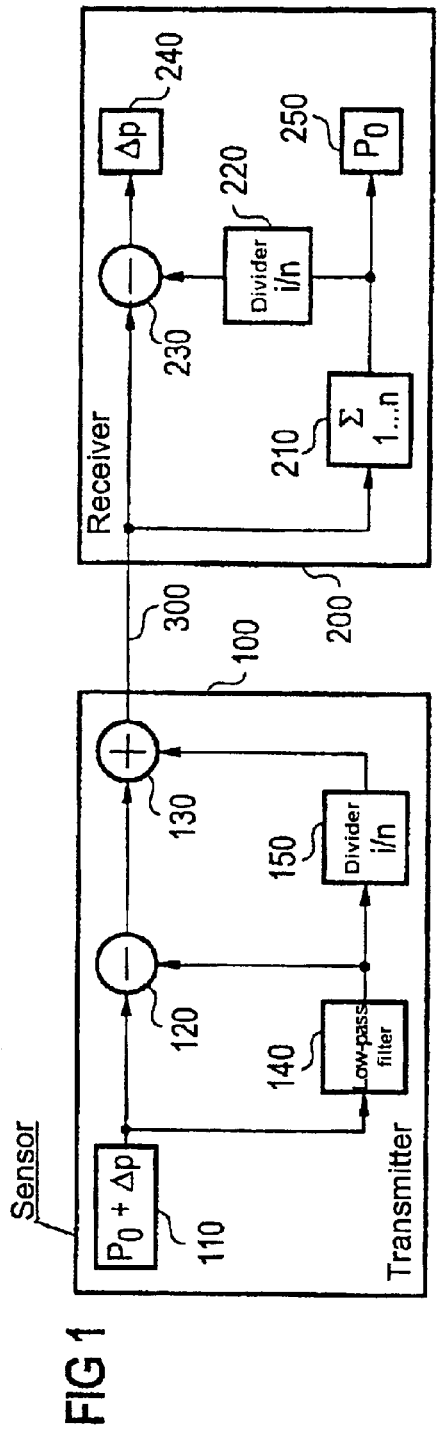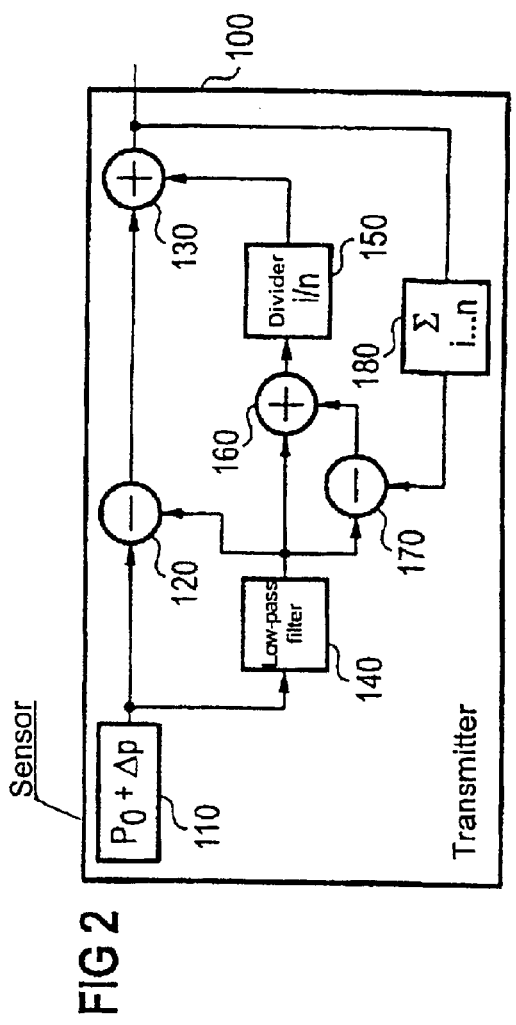

METHOD AND CONFIGURATION FOR TRANSMITTING DATA IN A MOTOR VEHICLE

BACKGROUND OF THE INVENTION

FIELD OF THE INVENTION

The invention relates to a method and a configuration having a transmitter and a receiver for transmitting digital data in a motor vehicle. The use of data transmission systems is known in motor vehicles. In a large number of application areas, measurement signals have to be transmitted from sensors to a central processor unit within a motor vehicle. In many transmission systems the data rate is limited. In the case of airbag systems, for example, data transmissions with 7 bit data word width and a transmission frequency of 2 kHz are used. In such systems, the pressure values that are measured in a side airbag, for example, are transmitted as data values. Such pressure values are usually composed of the average ambient pressure, which lies in a range from 600 to 1300 mbar, and from a dynamic change in pressure that lies in the range from minus 50 to plus 200 mbar.

It is desirable to measure such data with a high resolution of, for example, 15 bits and further process it. However, the given transmission links do not permit such high resolution.

SUMMARY OF THE INVENTION

It is accordingly an object of the invention to provide a method and a configuration for digitally transmitting data in a motor vehicle that overcome the above-mentioned disadvantages of the prior art methods and devices of this general type.

With the foregoing and other objects in view there is provided, in accordance with the invention, a method for transmitting data in a motor vehicle having a transmitter and a receiver. The method includes splitting a signal that is to be transmitted, into a constant part and a variable part, and combining a partial value of the constant part with the variable part and transmitting a result signal to the receiver.

The advantage of the invention is that existing transmission systems can continue to be used and nevertheless a higher resolution can be obtained at least for a composite signal. The method according to the invention extracts a constant part and a variable part from the data signal that is determined. The values that are extracted in this way are transmitted over the transmission link that is present. Depending on the bandwidth of the composite signal, various methods can be applied for transmitting relatively low bandwidth signals with a possibly higher resolution.

In a first embodiment, the constant part is, for example, divided by a predefined value N and only this fraction is transmitted. The constant part can be reconstructed by N-fold transmission of the fraction. In one development errors that arise as a result of the division are compensated in that the error is minimized by a control loop. This embodiment can be used in both analog and digital systems.

In a second embodiment, a digitized value of the constant part is transmitted bit by bit. According to the invention, just a single bit is transmitted per transmitted data word, and the rest of the data word can be used for the variable value.

In accordance with an added mode of the invention, there are the steps of dividing the constant part by a predefinable value N resulting in N divided values, and summing each of the divided values with the variable part forming the result signal to be transmitted.

In accordance with an additional mode of the invention, there is the step of determining the constant part by a low-pass filtering of the signal that is to be transmitted.

In accordance with another mode of the invention, there is the step of applying a correction factor to the constant part.

In accordance with a further mode of the invention, there is the step of forming the correction factor by summing N values to be transmitted, minus the constant part.

In accordance with an added additional mode of the invention, there is the step of transmitting the constant part as a digital word, the constant part being divided into M identical word parts where $M \geq 2$, and in each case a word part of the constant part is transmitted in combination with the variable part so that after in each case M transmissions a value of the constant part is transmitted.

In accordance with a further additional mode of the invention, there is the step of adding the N divided values transmitted to the receiver in the receiver to determine the constant part. The constant part is divided by N in the receiver resulting in a further divided value and the further divided value is subtracted from the result signal received in order to obtain the variable value.

In accordance with an additional further mode of the invention, there is the step of forming the variable part by subtracting the constant part from the result signal transmitted.

With the foregoing and other objects in view there is provided, in accordance with the invention, a configuration for transmitting data in a motor vehicle. The configuration includes a transmitter having extraction means for extracting a constant part from a signal to be transmitted formed of a constant part and a variable part, a subtracting element having an output for subtracting the constant part from the signal to be transmitted and the subtracting element is connected to the extraction means, a divider having an output is connected downstream of the extraction means and divides the constant part by N, and an adding element connected to the output of the divider and to the output of the subtracting element. The adding element has an output where a data-reduced signal for transmission can be tapped. A receiver is provided for communicating with the transmitter.

In accordance with an added feature of the invention, the receiver includes a summing element having an output where the constant part of the data-reduced signal which is to be transmitted can be tapped, a divider connected downstream of the summing element and divides the constant part by N, and a subtracting element receiving the transmitted data-reduced signal and an output signal of the divider and having an output where the variable signal can be tapped. The subtracting element is connected to the divider.

In accordance with an additional feature of the invention, the transmitter has means for correcting the constant part. The means for correcting the constant part includes a summing element for summing N data-reduced signal values and outputting an output signal, a further subtracting element connected to the summing element and to which the output signal of the summing element and the constant part are fed, the further subtracting element outputting an output signal, and a further adding element connected to the further subtracting element and to the extraction means. The constant part and the output signal of the subtracting element are fed to the further adding element and the further adding element having an output connected to the divider.

In accordance with another feature of the invention, the extraction means includes a low-pass filter.

In accordance with a concomitant feature of the invention, the transmitter and the receiver form part of a microprocessor.

Other features which are considered as characteristic for the invention are set forth in the appended claims.

Although the invention is illustrated and described herein as embodied in a method and a configuration for transmitting data in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a first embodiment of a transmitter and receiving unit according to the invention;

FIG. 2 is a partial block circuit diagram of a second embodiment of the transmitting unit;

DESCRIPTION OF THE PREFERRED EMBODIMENTS

Figure 3:
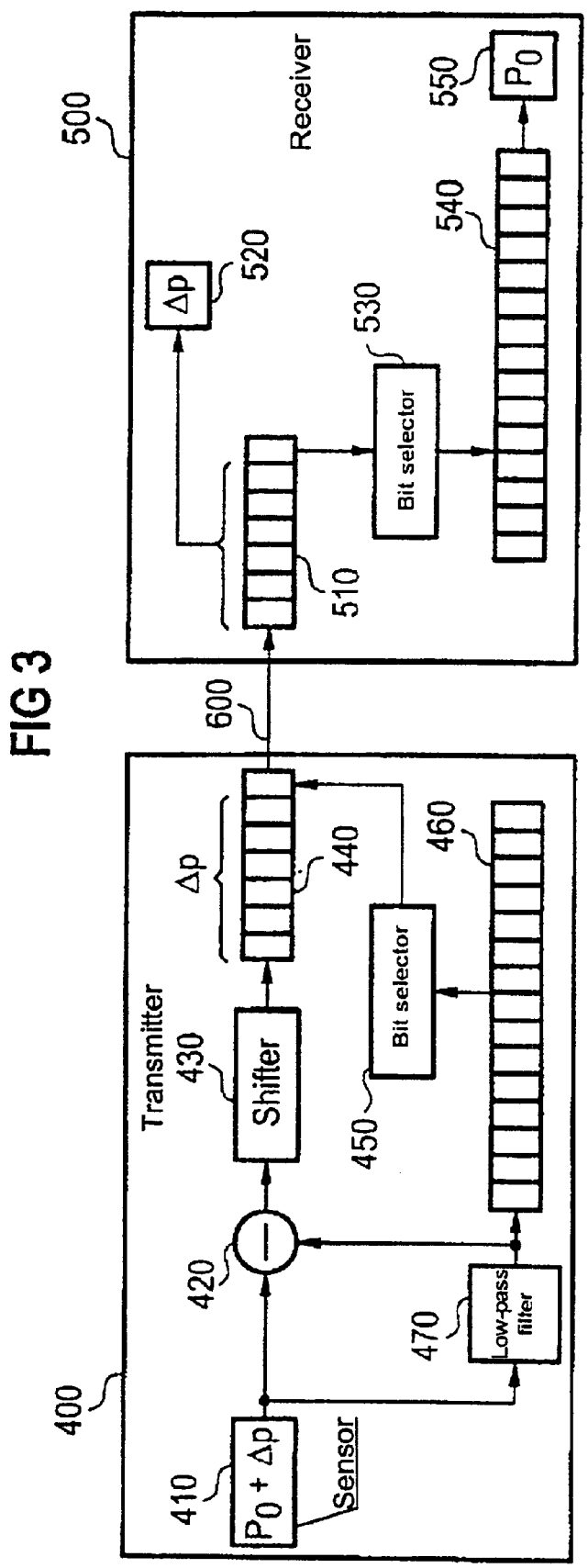
FIG. 3 is a block circuit diagram of a third embodiment of the transmitting and receiving unit.

In all the figures of the drawing, sub-features and integral parts that correspond to one another bear the same reference symbol in each case. Referring now to the figures of the drawing in detail and first, particularly, to FIG. 1 thereof, there is shown a transmitter 100, for example a satellite of an airbag system, and a receiver unit 200, for example what is referred to as an electronic control unit (EMU) of an airbag system. Reference symbol 110 designates a sensor unit that supplies a pressure signal. The internal pressure is determined, for example, in a vehicle door by the pressure sensor 110. Given an impact against the vehicle door, the internal pressure increases suddenly, which is reflected in the pressure signal. The unit 110 can also contain an analog/digital converter that converts the pressure signal determined in analog terms into a digital signal with a resolution of, for example, 15 bits. As a result, a resolution of 0.1 mbar can be achieved. However, the system can also be of completely analog construction. The frequency range of such a pressure signal usually lies in the range from 0 to 400 Hz. The digitized or analog signal is fed to a low-pass filter 140 and to a first input of a subtracting element 120. An output of the low-pass filter 140 is connected to a second input of the subtracting element 120. Furthermore, the output of the low-pass filter 140 is wired to an input of a divider 150. The divider 150 divides the fed-in value by N. N can assume a value of, for example, 1024. The value that is divided in this way is fed to a first input of an adding element 130 whose second input is connected to an output of the subtracting element 120. The output of the adding element 130 is connected to a transmission link 300. At the receiver end, the transmission link 300 is wired to an input of a summing element 210 and to a first input of a subtracting element 230. An output of the summing element 210 supplies a constant part $p_0$ at a terminal 250 after N summations. The output of the summing element 210 is also connected to an input of a further divider 220. The divider 220 also divides the received value by N. An output of the divider 220 is connected to a second input of the subtracting element 230. The variable value $\Delta p$ of the pressure signal can be tapped at an output of the subtracting element 230 via a terminal 240.

The ambient pressure or constant part $p_0$ is filtered out, by the low-pass filter 140, from the pressure signal $p_0+\Delta p$ which is determined. The low-pass filter 140 can have a cutoff frequency of, for example, 0.3 Hz. The variable value $\Delta p$ is determined by the subtracting element 120. In doing this, the subtracting element 120 subtracts the constant part $p_0$ determined by the low-pass filter 140 from the digitized pressure signal. The constant part $p_0$ which is determined in this way at the output of the low-pass filter 140 is then divided by the divider 150, for example by the value N=1024. The component value of $p_0$ that is generated in this way is added to the variable value $\Delta p$ by the adding element 130 and transmitted over the transmission link 300.

The component value $p_0$ that is generated in this way can be used in each of the following N transmissions as a summand, combined in each case with the current variable value $\Delta p$. Only after the N transmissions have taken place in this way is the current constant part, which is an element determined by the filter method described above, divided by the value N. Before the component value generated in this way is again the summand with respect to the variable value in the next N transmission steps. Alternatively, the constant part $p_0$ that is currently present at the output of low-pass filter 140 is always divided by the value N, and the current component value of $p_0$ that is determined in this way is always transmitted. In this way, the component value can vary with respect to each transmission, and provided that the constant part changes between two sampling times, different component values are then also summed in the receiver 200. However, it can usually be assumed that in described application examples of the invention, fluctuations in the constant part occur only with a very large time constant so that as a result transmitted current component values do not differ significantly in their amplitude from the transmission of a component value in accordance with the aforementioned first alternative in which the component value of a previous sampling time is transmitted over N transmission cycles.

Both signals are reconstructed at the receive end. This is carried out by the summation of N=1024 successive values in the present case, by the summing element 210. The output value that is present at the summing element 210 is in turn divided by N by the divider 220 and subtracted from the received value by the subtracting element 230. As a result, the variable value $\Delta p$ is available at the output of the subtracting element 230, and the constant part $p_0$ is available at the output of the summing element 210.

The summing element 210 sums both the component values of $p_0$ and the variable values $\Delta p$ that are transmitted over the transmission link 300. The variable values $\Delta p$ usually fluctuate around the constant part $p_0$ as a result of which the errors which are caused by this for large values of N are averaged out. In order nevertheless to prevent small errors being amplified by the summation, FIG. 2 shows a further embodiment of the transmitter 100 with an integrated error correction. For this purpose, the output signal of the low-pass filter 140 is fed to a first input of a further subtracting element 170. An adding element 160 is inserted between the low-pass filter 140 and the divider 150, a first input of the adding element 160 being connected to the output of the low-pass filter 140 and its output being connected to the input of the divider 150. The output of the subtracting element 170 is connected to a second input of the adding element 160. The output of the first adding element 130 is connected to the input of a further summing element 180, which operates in the same way as the first summing element 220 in the receiver unit 200. The output of the summing element 180 is connected to the second input of the subtracting element 170.

By the correction unit described, the same sum which the summing element 220 forms in the receiving unit 200 is formed in the transmitter unit 100 via the further summing element 180. The deviations $\Delta p_0$ are formed by forming the difference between the signal and the output signal of the low-pass filter 140 by the subtracting element 170. The deviations $\Delta p_0$ of the transmitted signal from the actual value $p_0$ are then fed in by the adding element 160 in such a way that a control loop is produced that corrects the errors of the sum.

The configuration according to the invention does not always transmit the complete constant part $p_0$ that is required with a significantly lower bandwidth, but rather, together with the pressure changes $\Delta p$, only a fraction that is integrated at the receiver end and can thus be reconstructed. As a result, the data set which is to be respectively transmitted can be drastically reduced without information loss and at the same time a large error tolerance achieved because the disturbance of individual information packets affects only a fraction of the constant part but not the entirety of the information which is distributed among a large number of data items. The method can be applied both for analog and digital data processing.

FIG. 3 shows a further embodiment of the present invention. Block 400 shows in turn a transmitter unit 400, for example a pressure sensor 410 with associated evaluation and transmission unit within a motor vehicle door. The pressure sensor 410 has an integrated analog/digital converter which converts the pressure $p_0+\Delta p$ into a digital value. An output of the sensor 410 is connected to a first input of a subtracting element 420 and to an input of a low-pass filter 470. An output of the low-pass filter 470 is wired to the second input of the subtracting element 420. Furthermore, the output value at the low-pass filter 470 is written into a register 460. An output of the subtracting element 420 is wired to a shift register 430 whose output is connected to a transmission register 440. A bit selecting device 450 is provided which is connected to the register 460 and which generates an output signal which is connected to a bit place of the register 440, for example the least significant bit (LSB). The transmission register 440 is connected to the transmission link 600.

A reception register 510, which is connected to the transmission link 600, is provided in the receiver 500, for example a processing unit for the airbag controller. The upper six places of the register 510 form the pressure variable value $\Delta p$, which can be tapped at the terminal 520. The LSB of the register 510 is connected to a bit selecting device 530. The bit selecting device 530 describes, as a function of a control signal, the individual bits of the register 540 which is connected to a terminal 550. The constant part $p_0$ of the pressure value can then be tapped at the terminal 550.

Figure 4:
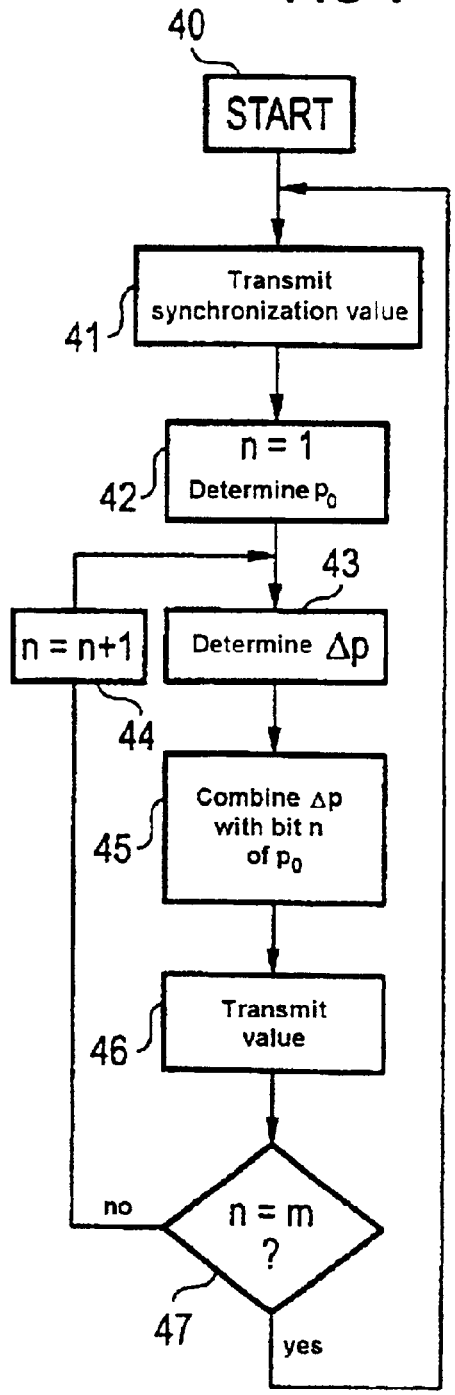
FIGS. 4 and 5 are flowcharts in accordance with the embodiment illustrated in FIG. 3.

The method which can be carried out by the embodiment described in FIG. 3 will now be explained in more detail in conjunction with FIG. 4 and FIG. 5. The method starts in step 40. First, in step 41 a synchronization value is transmitted over the transmission link 600. To do this, it is possible, for example, to transmit a sequence of synchronizing values that can be detected in the receiver 500. As the simplest example, it is possible, for example, to transmit a sequence "0101010", "1010101" for synchronization. In step 42, a counter is set to N=1 and the pressure constant part $p_0$ is determined by the low-pass filter 470. In step 43, the pressure variable value $\Delta p$ is determined by the subtracting element 420. In step 45, the pressure variable value $\Delta p$ is then combined with bit 1 of $p_0$. To do this, the bit selecting unit 450 selects, for example, the first bit from the register 460. In step 46, the contents of the register 440 are transmitted, over the transmission link 600, with the combination of the pressure variable value $\Delta p$ and in place of the pressure constant value $p_0$. In step 47 it is checked whether N is equal to the number M of places of the register 460. If the register 460 is a 15 bit register, it is checked whether N is equal to 15. If not, N is increased by 1 in step 44 and the step sequence 43, 45, 46, 47 is processed until N=M. In other words each place of the register 460 is transmitted individually with the pressure variable value. If the value of N=M, the system jumps back to step 41 of the procedure in which the synchronization signal is transmitted again. At each new pass, the bit place 2, 3, 4, . . . , 15 of the register 460 is sampled and transmitted.

Figure 5:
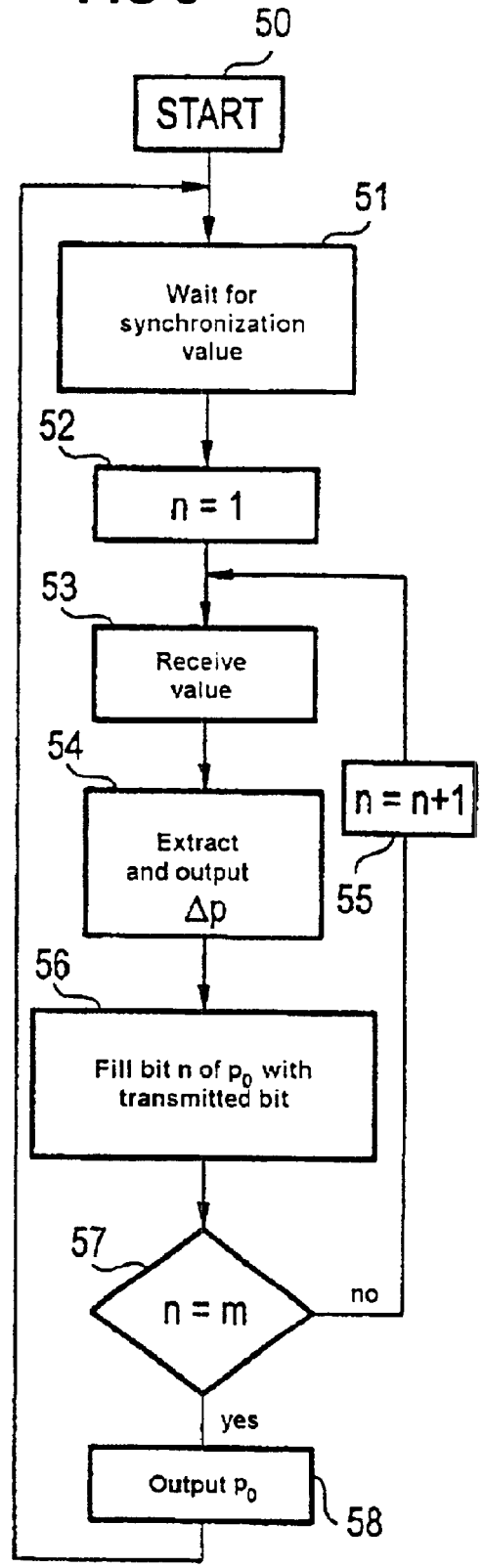

The method for receiving the pressure values starts in step 50 according to FIG. 5. In step 51, the system waits for the synchronization values transmitted by the transmitter unit 400. As soon as these values have been received, the counter is set to N=1 in step 52. In step 53, the first value is received in the register 510. In step 54, the upper six bits of the register 510 are output to the output terminal 520 at which the pressure variable value $\Delta p$ can be tapped. In step 56, the LSB of register 520 is written into the N-th place of the register 540 via the bit selecting device 530. In step 57 it is checked whether N=M. If not, in step 55, N is incremented by one place and the steps 53, 54, 56, 57 are repeated until N=M. If N=M, register 540 has been completely written to and now contains the complete value of the pressure constant part $p_0$. In step 58, this value is output via the connecting terminal 550.

The variable pressure value is transmitted with only six bits. However, each bit can have a resolution of 0.1 mbar. The maximum pressure variable value can be approximately ±3.2 mbar. If the fluctuation width of the pressure variable signal is greater, the resolution can be correspondingly reduced. In this embodiment, it is possible to transmit the pressure variable value with the maximum time resolution of approximately 2 kHz and the pressure constant part with approximately 120 Hz (when two synchronization values are used).

In a further embodiment, a resolution of 12 bits can also be provided for the pressure variable value. However, in this case, two transmissions per pressure variable value and 15 transmissions per pressure constant part value are necessary. However, the transmitter and receiver units must be expanded by an appropriate evaluation logic. However, for the synchronization it is possible to use the same method as described above. Because the bandwidth of the pressure variable signal is restricted to approximately 400 Hz, the division of the pressure variable value into two component values with a transmission bandwidth of 2 kHz is still not a problem.

The method according to the invention can be expanded as desired within the scope of the partial transmission. It is essential that the constant part that has a very much lower bandwidth (for example 0.3 Hz) is transmitted by use of divided transmission.

I claim:

1. A method for transmitting data in a motor vehicle having a transmitter and a receiver, which comprises the steps of:

splitting a signal which is to be transmitted, into a constant part and a variable part; and combining a partial value of the constant part with the variable part and transmitting a result signal to the receiver.

2. The method according to claim 1, which comprises:

dividing the constant part by a predefinable value N resulting in N divided values; and summing each of the divided values with the variable part forming the result signal to be transmitted.

3. The method according to claim 1, which comprises determining the constant part by a low-pass filtering of the signal which is to be transmitted.

4. The method according to claim 1, which comprises applying a correction factor to the constant part.

5. The method according to claim 4, which comprises forming the correction factor by summing N values to be transmitted, minus the constant part.

6. The method according to claim 1, which comprises transmitting the constant part as a digital word, the constant part being divided into M identical word parts where $M \geq 2$, and in each case a word part of the constant part is transmitted in combination with the variable part so that after in each case M transmissions a value of the constant part is transmitted.

7. The method according to claim 2, which comprises adding the N divided values transmitted to the receiver in the receiver to determine the constant part, the constant part is divided by N in the receiver resulting in a further divided value and the further divided value is subtracted from the result signal received in order to obtain the variable value.

8. The method according to claim 1, which comprises forming the variable part by subtracting the constant part from the result signal transmitted.

9. A configuration for transmitting data in a motor vehicle, comprising:

a transmitter having extraction means for extracting a constant part from a signal to be transmitted formed of a constant part and a variable part, a subtracting element having an output for subtracting the constant part from the signal to be transmitted and said subtracting element connected to said extraction means, a divider having an output and connected downstream of said extraction means and dividing the constant part by N, and an adding element connected to said output of said divider and to said output of said subtracting element, said adding element having an output where a data-reduced signal for transmission can be tapped; and a receiver for communicating with said transmitter.

10. The configuration according to claim 9, wherein said receiver includes:

a summing element having an output where the constant part of the data-reduced signal which is to be transmitted can be tapped;

a divider connected downstream of said summing element and divides the constant part by N; and a subtracting element receiving the transmitted data-reduced signal and an output signal of said divider and having an output where the variable signal can be tapped, said subtracting element connected to said divider.

11. The configuration according to claim 9, wherein said transmitter has means for correcting the constant part.

12. The configuration according to claim 11, wherein said means for correcting the constant part includes:

a summing element for summing N data-reduced signal values and outputting an output signal;

a further subtracting element connected to said summing element and to which the output signal of said summing element and the constant part are fed, said further subtracting element outputting an output signal; and a further adding element connected to said further subtracting element and to said extraction means, the constant part and the output signal of said subtracting element are fed to said further adding element and said further adding element having an output connected to said divider.

13. The configuration according to claim 9, wherein said extraction means includes a low-pass filter.

14. The configuration according to claim 9, wherein said transmitter and said receiver form part of a microprocessor.

* * * * *